United States Patent [19]

Hayashida

[11] 3,994,204

[45] Nov. 30, 1976

[54] HYDRAULIC BRAKING FORCE MULTIPLYING DEVICE

[75] Inventor: Yoshihiro Hayashida, Chigasaki, Japan

[73] Assignee: Tokico Ltd., Kanagawa, Japan

[22] Filed: May 27, 1975

[21] Appl. No.: 580,797

[30] Foreign Application Priority Data
May 27, 1974 Japan.............................. 49-59433

[52] U.S. Cl. ................................... 91/372; 91/378
[51] Int. Cl.² ........................................... F15B 9/10
[58] Field of Search ............. 91/373, 372, 371, 370, 91/434, 378

[56] References Cited
UNITED STATES PATENTS

| | | | |
|---|---|---|---|
| 2,544,042 | 3/1951 | Pontius................................ | 91/372 |
| 2,775,957 | 1/1957 | Anderson............................ | 91/372 |
| 2,883,970 | 4/1959 | Stelzer................................. | 91/373 |
| 2,883,971 | 4/1959 | Ayers, Jr.............................. | 91/373 |
| 3,747,473 | 7/1973 | Bach et al........................... | 91/373 |

Primary Examiner—Paul E. Maslousky
Attorney, Agent, or Firm—Wenderoth, Lind & Ponack

[57] ABSTRACT

A hydraulic braking force multiplying device comprising an output member slidably fitted on a housing for actuating a piston of a hydraulic master cylinder, a working chamber defined between the housing and the output member, a valve seat member slidably fitted in an axial bore of the housing and rigidly secured to the output member, an input member slidably fitted in the axial bore and defining an intermediate chamber between the valve seat member, a valve member adapted to be actuated by the input member and having a valve portion of a valve mechanism for cooperating with a valve seat formed on the valve seat member, a pressure chamber permanently communicating with a source of pressure fluid being and being disposed in the housing and adapted to be connected with the intermediate chamber through the valve mechanism, a passage formed in the valve member for connecting the intermediate chamber with the working chamber, and a passage formed in the input member for connecting the intermediate chamber with a reservoir for hydraulic fluid, the connection through the passage in the input member being cut off when the input member engages with the valve member.

3 Claims, 1 Drawing Figure

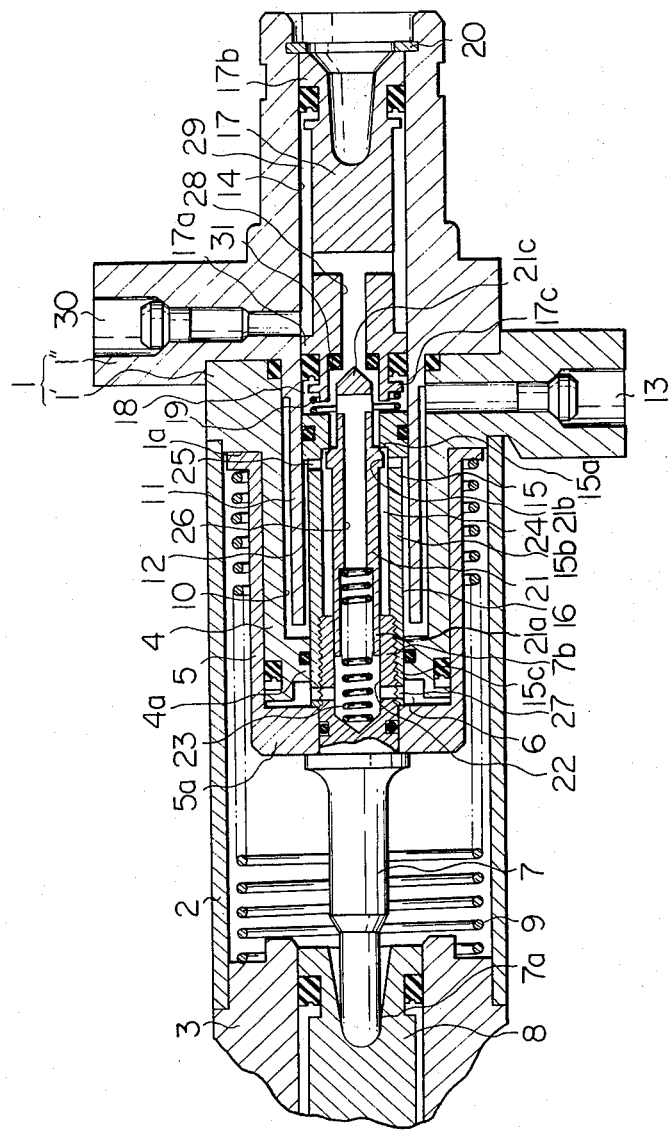

HYDRAULIC BRAKING FORCE MULTIPLYING DEVICE

BACKGROUND OF INVENTION

The present invention relates to a hydraulic braking force multiplying device for use in an automobile.

A hydraulic braking force multiplying device is, in general, connected to a master cylinder for actuating the master cylinder. Devices of this type can be classified into two groups depending on the movement of the brake pedal: one of which is called as "stroke type," in which stroke of an input shaft of the braking force multiplying device corresponds to an amount which is required to advance a piston in the master cylinder; and the other which is referred to as the so-called non-stroke type, in which the necessary stroke of the input shaft is only a small amount required to actuate a valve mechanism incorporated in the device. The former type is attended with the drawbacks that a driver suffers from fatigue, and that the construction becomes a large-sized and complicated one, while the latter type involves the shortcomings that failure in the power source results in failure of the entire system.

Brief Summary of the Invention

It is accordingly a primary object of the present invention to provide a hydraulic braking force multiplying device of the stroke type having a reduced overall length and a simplified construction.

According to the present invention, there is provided a hydraulic braking force multiplying device comprising an output member slidably fitted on a housing for actuating a piston of a hydraulic master cylinder, a working chamber defined between the housing and the output member, a valve seat member slidably fitted in an axial bore of the housing and fixedly secured to the output member, an input member slidably fitted in the axial bore and defining an intermediate chamber with the valve seat member, a valve member adapted to be actuated by the input member and having a valve portion of a valve mechanism for cooperating with a valve seat formed on the valve seat member, a pressure chamber permanently communicating with a source of pressure fluid being and being disposed in the housing and adapted to be connected with the intermediate chamber through the valve mechanism, a passage formed in the valve member for connecting the intermediate chamber with the working chamber, and a passage formed in the input member for connecting the intermediate chamber with a reservoir for hydraulic fluid, the connection through the passage in the input member being cut off when the input member engages with the valve member.

Further objects and features of the present invention will be apparent from the ensuing part of the specification, taken in conjunction with the attached drawing which indicates a preferred embodiment of the invention.

BRIEF DESCRIPTION OF THE DRAWING

The drawing is a longitudinal cross-sectional view of a hydraulic braking force multiplying device according to the present invention.

DETAILED DESCRIPTION OF THE INVENTION

In the drawing, a hydraulic braking force multiplying device according to the invention comprises a housing 1 consisting of two mutually connected members 1' and 1'', and an annular spacer 2 for rigidly connecting the housing 1 to a master cylinder 3. The member 1' of the housing 1 has an annular projecting portion 4 which projects towards the master cylinder 3.

Shown at 5 is a cup-shaped output member slidably and sealingly fitted on the outer periphery of the projecting portion 4, so that a working chamber 6 is defined between the output member 5 and the projecting portion 4 as shown. A base wall or a closed end 5a of the output member 5 has a central opening for sealingly receiving a push rod 7. One end 7a of the push rod 7 engages with a piston 8 of the master cylinder 3. The output member 5 is urged to a normal retracted position as shown by means of a coil spring 9 and engages with a stopper 1a formed on the housing member 1'.

An axial bore 10 is formed in the housing member 1' which receives an annular projecting portion 11 of the housing member 1''. An annular space or a passage 12 is formed between the bore 10 and the annular projecting portion 11 and is connected to a source of hydraulic pressure (not shown) through an inlet port 13. An axial bore 14 extends through the housing member 1'' and the projecting portion 11 thereof, and the inner end of the bore 14 is communicated with the passage 12.

Shown at 15 is a generally cylindrical valve seat member which includes a large diameter portion 15a sealingly and slidably fitted in the guide bore 14, and a reduced diameter portion 15b which defines an annular space 16 between the guide bore 14. The reduced diameter portion 15b sealingly and slidably extends through and is supported by the bottom wall 4a of the projecting portion 4. An end portion 15c which is remote from the large diameter portion 15a is screw threadedly engaged with one end 7b of the push rod 7 so as to form a unitary assembly comprising the output member 5, push rod 7 and the valve seat member 15.

Denoted at 17 is an input member sealingly and slidably fitted in the bore 14 of the housing member 1'' by means of axially spaced land portions 17a and 17b. The land portion 17a of the input member 17 cooperates with the large diameter portion 15a of the valve seat member 15 so as to define an intermediate space 18 in the bore 14. The inner end 17c of the input member 17 projects into the intermediate space 18 towards the valve seat member 15 and is spaced from the valve seat member in the normal operating condition. A spring 19 is disposed between the input member 17 and the valve seat member 15, and urges the input member 17 against a stop 20 in the normal retracted position.

Denoted at 21 is a valve member, one end portion 21a of which is sealingly and slidably fitted in an axial bore 22 formed in the push rod 7, and the other end 21c of which acts as a valve member of a normally opened valve mechanism for cooperating with a valve seat 31 formed in the inner end of the input member 17.

A valve portion 21b is formed on the outer periphery of the valve member 21 for engaging with or disengaging from a valve seat formed in the inner periphery of the valve seat member 15 for constituting a normally closed valve mechanism. The valve member 21 is urged rightwardly as shown in the drawing by means of a valve spring 23 which acts to maintain the normally closed valve mechanism in the closed position.

A pressure chamber 24 is formed between the inner periphery of the valve seat member 15 and the outer periphery of the valve member 21, and the space 24 is permanently communicated with the source of pressure fluid permanently through a radial bore 25 formed in the valve seat member 15, the annular space 16, the annular space or passage 12, and the inlet port 13.

When the valve member 21 is moved to the left in the drawing, the normally closed valve mechanism opens and the pressure chamber 24 is connected with the intermediate chamber 18.

The intermediate chamber 18 is permanently communicated with the working chamber 6 by means of an axial and radial passage 26 formed in the valve member 21, and a radial passage 27 extending through the input shaft 7 and the valve seat member 15. The intermediate chamber 18 is also communicated with a reservoir for hydraulic fluid (not shown) through the valve seat 31 of the normally open valve mechanism, an axial and radial passage 28 formed in the input member 17, an annular space 29 defined between the bore 14 and the outer periphery of the input member 17 and through an outlet port 30.

The hydraulic braking force multiplying device having the construction as above described operates as follows.

When a manipulating force is applied to a brake pedal by a driver so as to operate the device previously maintained in the inoperative condition shown in the drawing, the input member 17 is moved leftwards. The leftward movement of the input member 17 causes the valve seat 31 formed at the left end of the passage 28 to engage with the conically shaped end 21c of the valve member 21, to thereby close the normally open valve mechanism and interrupt the communication between the intermediate chamber 18 and the outlet port 30. The further leftward movement of the input member 17 carries the valve member 21 in the same direction, whereby the valve portion 21b separates from the valve seat of the normally closed valve mechanism, thereby communicating the pressure chamber 24 and the intermediate chamber 18 with each other. Consequently, pressure fluid is introduced through the passage 26, the bore 22 of the push rod 7, and the radial bore 27 into the working chamber 6, so that the output member 5 will be moved leftwards, thereby actuating the piston 8 of the master cylinder 3 through the push rod 7, whereby the braking action is effected. Since the valve seat member 15 is integrally connected with the output member 5, the valve seat formed in the valve seat member 15 moves in the same direction when the output member 5 is moved leftwards, and engages with the valve portion 21b of the valve member 21, thereby interrupting the supply of pressure fluid into the working chamber 6, and thus the leftward movement of the output member will be stopped.

At that time, the input member 17 receives hydraulic pressure the intermediate chamber 18 on its inner end, which acts on the driver as a reacting force or an operating feeling.

When the brake pedal is depressed further, the valve portion 21b on the valve member 21 separates again from the valve seat of the valve seat member 15, thereby supplying further pressure fluid to the working chamber 6, and the output member 5 moves to a new position where the communication through the valve portion 21b and the corresponding valve seat of the valve seat member 15 is cut-off, whereby a larger braking force is produced by the master cylinder.

When the input force applied on the brake pedal is reduced, the input member 17 is moved backward according to hydraulic pressure in the intermediate chamber 18 and the force of the spring 19 to a position corresponding to the input force. In such case, the valve seat 31 of the input member 17 detaches from the valve portion 21c of the valve member 21, and a portion of the fluid in the intermediate chamber 18 is discharged to the reservoir, whereby the output member 5, the push rod 7 and the valve member 21 move rightwardly until the valve portion 21c again engages with the valve seat 31.

It will be understood from the above description that the stroke of the output member 5 corresponds to that of the input member 17.

When pressure in the source of hydraulic pressure is lost, it is possible to move the output member 5 through the valve seat member 15 by moving the input member 17 leftwards.

As is apparent from the foregoing, the hydraulic braking force multiplying device of this invention comprises the housing 1, the output member 5, and the valve member 21 being telescopically engaged with each other and forming a simple construction, whereby the overall length of the device can be reduced relative to prior art stroke type force multiplying devices. Further, the device of the invention is compact in size, and is thus advantageous with regard to required mounting space and production costs. The output member 5 is disposed on the outer periphery of the projecting portion 4 of the housing member 1', and thus a large output force can be obtained. Further, the valve seat member 15 is urged rightwardly according to hydraulic pressure in the pressure chamber 24, and the spring constant of the spring 9 can be reduced.

We claim:
1. A hydraulic force multiplying device comprising:
a housing having an inlet port for communication with a source of hydraulic fluid under pressure and an outlet port for communication with a hydraulic fluid reservoir, said housing having extending therethrough a stepped bore including relatively large and small diameter portions, said housing having integrally formed therewith at a first end thereof an axially extending annular projecting portion;
a cup-shaped output member having an inner surface slidably fitted around said annular projecting portion;
a working chamber defined between said output member and said annular projecting portion;
a generally cylindrical valve seat member having relatively large and small diameter portions sealingly and slidably fitted in said large and small diameter portions, respectively, of said stepped bore, a first end of said valve seat member being fixedly secured to said output member;
an input member slidably fitted within said large diameter portion of said stepped bore, said input member having an inner end positioned adjacent a second end of said valve seat member, said input member having therethrough a passage having a first end permanently in communication with said outlet port and a second end forming a valve opening at said inner end of said input member;
a generally cylindrical valve member coaxially disposed within said valve seat member;
said valve member having a first end positioned adjacent said valve opening at said inner end of said input member and forming therewith a normally open first valve which is closeable by inward movement of said input member to actuate the device;

said valve seat member having inwardly thereof an annular valve seat, said valve member having outwardly thereof a valve portion, said valve seat and said valve portion forming a normally closed second valve;

spring means positioned for biasing said valve member toward said input member and for closing said second valve;

a pressure chamber formed between said valve seat member and said valve member and permanently in communication with said inlet port, a first end of said pressure chamber being normally closed and defined by said normally closed second valve, a second end of said pressure chamber being defined by mutual sealing and sliding contact between said valve seat member and said valve member; and an axial bore through said valve member, a first end of said axial bore being permanently in communication with said working chamber, a second end of said axial bore being in communication with said outlet port through said passage when said first valve is open, said second end of said axial bore being in communication with said pressure chamber when said second valve is open.

2. A device as claimed in claim 1, wherein a second end of said valve seat member comprises said large diameter portion thereof slidably engaging said large diameter portion of said stepped bore, and said small diameter portion of said stepped bore is adjacent said working chamber.

3. A device as claimed in claim 2, wherein said large diameter portion of said stepped bore has an axial length sufficient to allow sliding movement therein of said valve seat member and said input member by an amount substantially equal to the length of axial movement of said output member.

* * * * *